Figure 1:
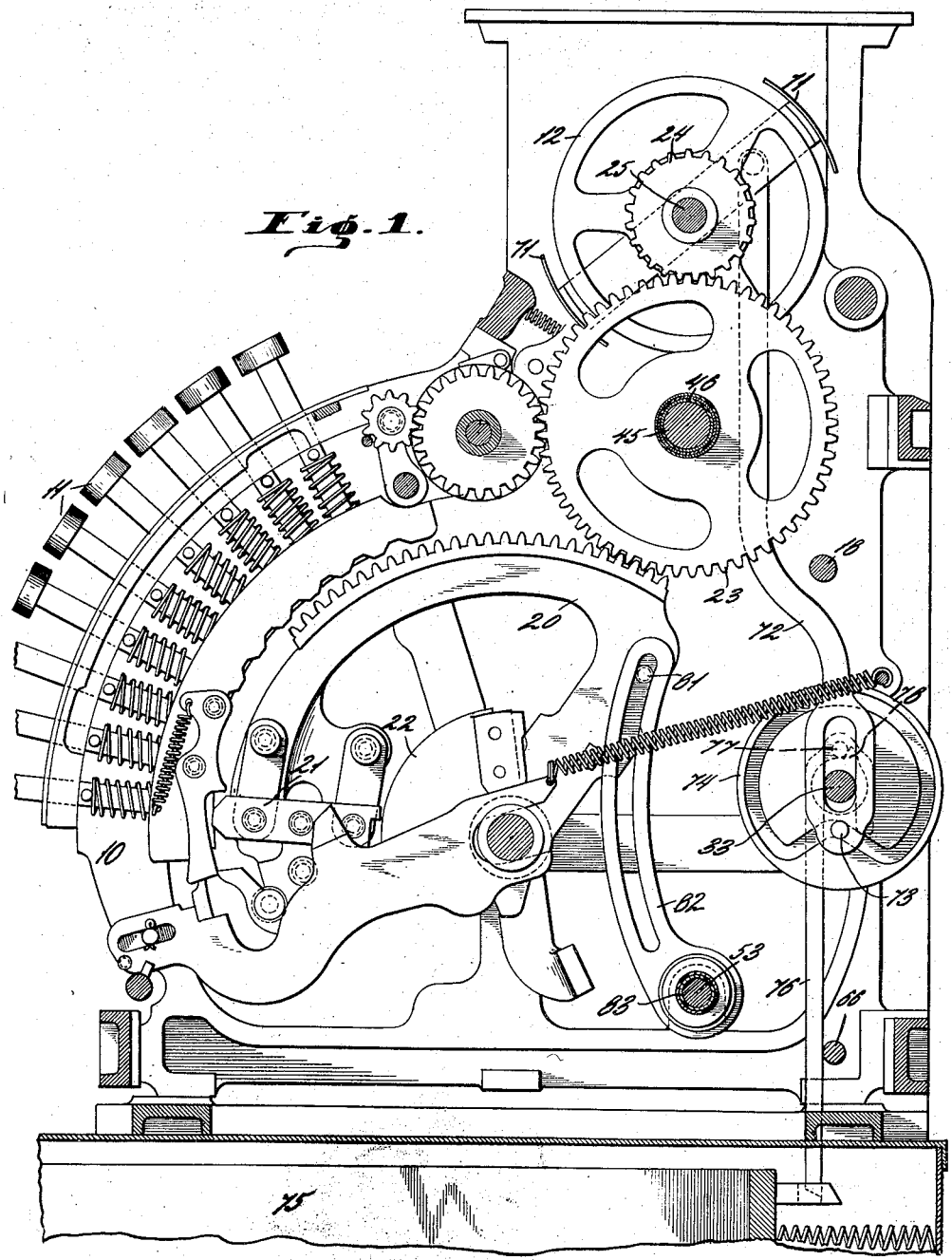

W. M. McCARTHY.
CASH REGISTER.
APPLICATION FILED JULY 18, 1907.

1,033,432.

Patented July 23, 1912.

3 SHEETS—SHEET 1.

Witnesses

Inventor
William M. McCarthy
by J. B. Maynard
+ R. C. Glass
Attorneys

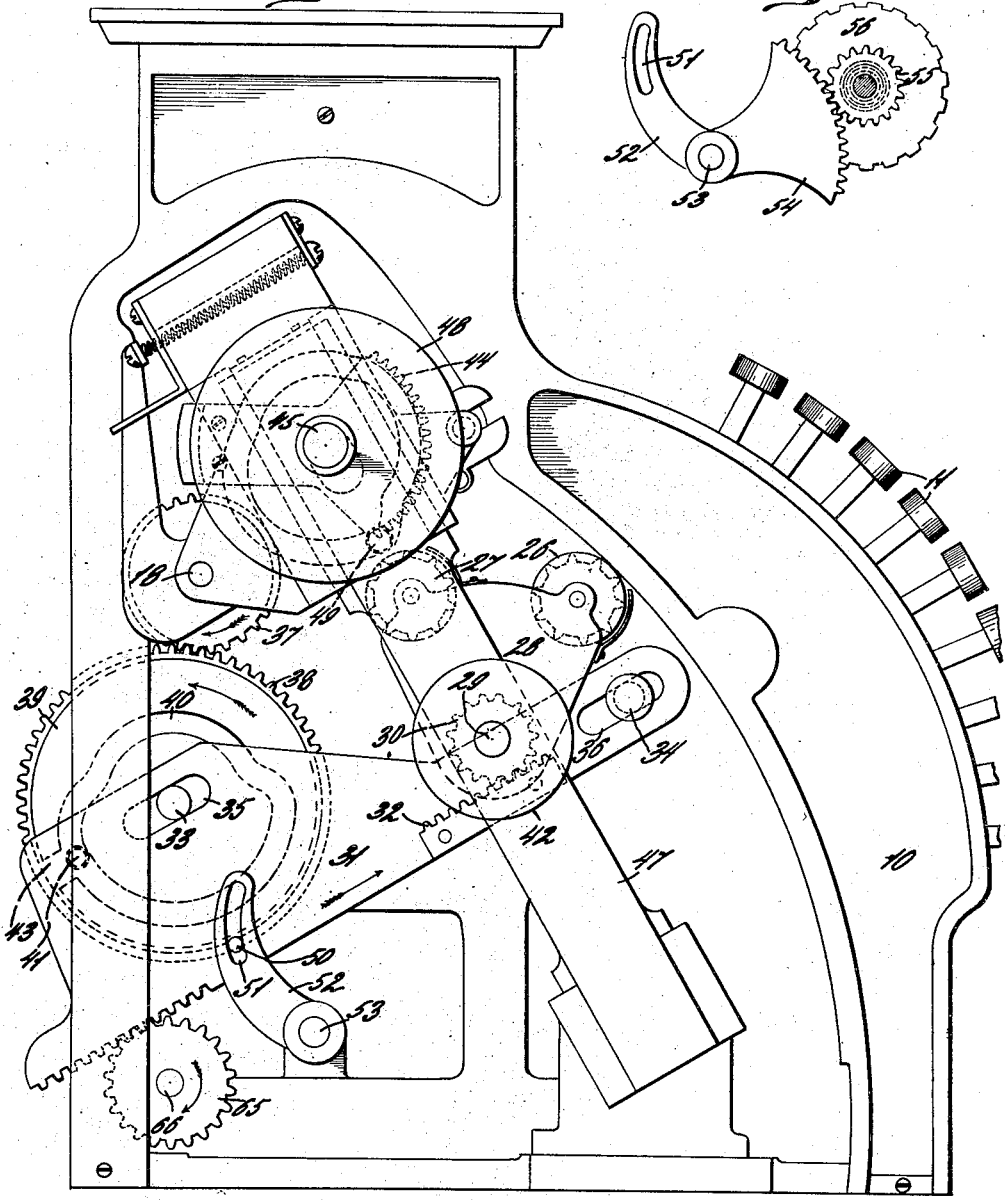

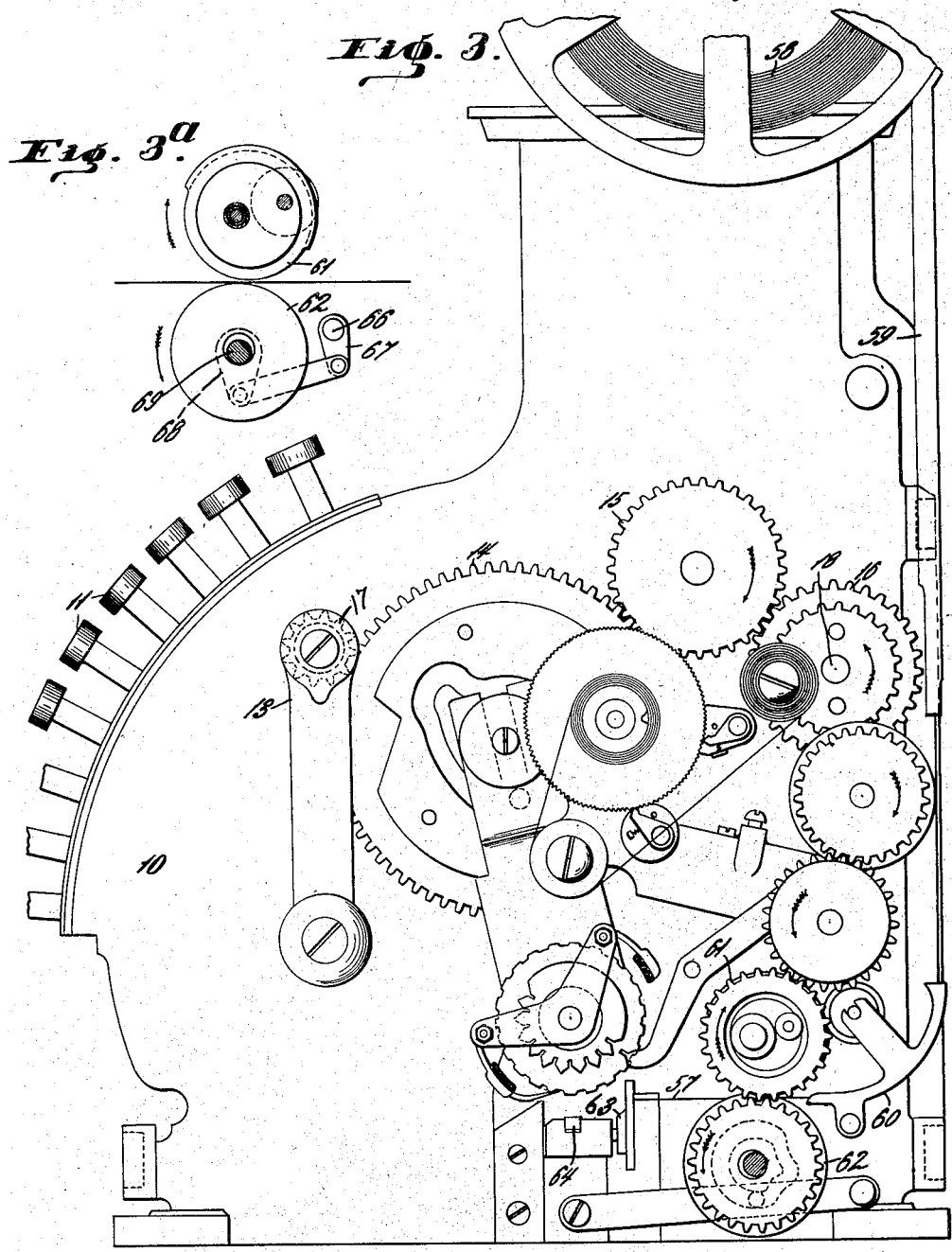

UNITED STATES PATENT OFFICE.

WILLIAM M. McCARTHY, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,033,432.　　　　　　　Specification of Letters Patent.　　Patented July 23, 1912.

Application filed July 18, 1907. Serial No. 384,326.

*To all whom it may concern:*

Be it known that I, WILLIAM M. MCCARTHY, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers and more particularly to that class of machines in which a certain number of complete operations of the machine constitute a cycle of operation for correlated transactions. Machines of this character may have various purposes in the cash register art, one example of such machines being the so-called "cost and selling price" machine, in which the machine is first completely operated to take an accounting of the cost price and then completely operated again to take an accounting of the selling price.

It is the purpose of the present invention to provide such improved forms of devices in connection with machines of this type as to automatically insure the separate accounting or grouping of these various correlated transactions upon a continued succession of operations of the machine; also to provide devices whereby when the machine stands at an intermediate stage in any one of these cycles of operations, certain normal functions of the machine will be or will have been disabled so as to indicate to the operator or to the purchaser that the normal cycle of operations has not been completed.

It is also among the purposes of this invention to provide in connection with the above devices, certain improvements in connection with the printing mechanism whereby at certain times in the cycle of operations the check feeding mechanism will be disabled.

With these and incidental objects in view, the invention consists in certain novel features of construction and combination of parts, the essential elements of which are set forth in appended claims and a preferred form of embodiment of which is hereinafter described with reference to the drawings which accompany and form part of this specification.

Of said drawings Figure 1 represents a vertical transverse section through the machine showing the cash drawer and flash mechanism. Fig. 2 represents a left side elevation showing the counter shifting mechanism. Fig. 3 is a right side elevation showing the printing mechanism. Fig. 3ᵃ is a detailed view of the check feed rollers showing the eccentric shaft; and Fig. 3ᵇ is a detailed view of part of the printing mechanism.

The type of machine to which these improvements are applied in its general form of construction is now well known in the art, being of the type shown in the patent to Thos. Carroll, #703,639, granted July 1, 1902 and #747,855 granted Dec. 22, 1903 and certain of the devices herein connected with the printing mechanism are similar to those shown in patent to Thos. Carroll #765,767 granted July 26, 1904, to all of which patents reference may be had for a more detailed description.

For the purpose of a better understanding of the description to follow, it may be stated that the specific form of means adopted in the present instance for securing the general broad results above outlined, comprises a machine having two independent counters, one of which is normally in a position to be thrown into engagement with the actuating segments, and by means of an automatic shifting device, after the first operation has effected an actuation of the first counter, the next succeeding operation actuates the second counter, and then the following operation acts upon the first counter, and so on, thus automatically shifting from the use of one counter to the other, so that the first counter could be used to register the cost price of goods sold and the second counter could be used for registering the selling price of the goods sold during any particular period and the second counter would give the total amount of the selling price for the same period. Further, since it is extremely necessary and desirable that the machine should not be left at an intermediate stage in its cycle of operations, that is, that it should be completely operated twice so as to register upon both counters and then leave the machine in condition so that upon the next operation the first counter will be prepared for operation and thus no mistake can be made by getting the cost price on the wrong counter, the indicator flash mechanism is so arranged that the indicators will be concealed except after the complete cycle of operations when both counters have been properly operated or the machine has been properly operated twice in succession; and in order to call attention still further to the incomplete stage of the machine at the end of one operation, the cash drawer is arranged so that it will be released only at the end of each second operation of the machine, so that if the machine is only given one complete operation, it will obviously rest in such condition as to show immediately that the necessary cycle of operations has not been completed. It is further desirable to issue a printed check during the second operation only in the cycle of operations and for this purpose mechanism is employed under control of the counter shifting means to rotate the eccentric bearings of one of the check rollers, thereby raising or lowering said roller to feed the check in connection with the entry of selling price amounts but to prevent the check being fed in connection with the entry of cost price amounts.

Referring to the accompanying drawings, 10 represents the frame of the machine; 11 the amount keys; 12 the indicators, and 13 the operating handle. By means of suitable gears 14, 15, 16 and 17 the rotary movement of the crank handle 13 imparts one complete rotation to the main operating shaft 18 at each operation of the machine.

The general operation is set forth at length in the various patents cited, but in brief such operation is as follows: Referring to Fig. 1 the segment 20 is connected with the latch 21, and said latch is adapted to be connected with and disconnected from the operating plate 22, which is oscillated at each operation of the crank handle 13. Upon the operation of said crank handle the operating segment is returned to zero and is then moved to its proper set position, as determined by the particular key depressed, at which point the latch 21 is disconnected from the oscillating plate 22. There is one of these operating segments 20 for each bank of keys, and each segment meshes with an intermediate gear 23, which in turn meshes with gears 24, journaled loosely on a transverse shaft 25 and made fast to the indicators 12. Thus upon the depression of any amount key and the turning of the crank handle 13 the indicators are set to proper position.

As seen in Fig. 2 the cost and selling price counters 26 and 27 are mounted in a rocking segmental frame 28, rocking upon a shaft 29. Mounted on the shaft 29 is a pinion 30 which is fast to the segment 28. Meshing with this pinion and fast to a sliding plate 31 is a toothed rack 32 which when reciprocated in the direction of the arrow will rock the frame 28 and bring the counter 26 into operative position. The plate 31 is carried by a shaft 33 and a pin 34 and is provided with elongated slots 35 and 36 to allow the reciprocating movement mentioned above. Mounted upon the main operating shaft 18 is a gear wheel 37 which meshes with a larger gear wheel 38 carried by the shaft 33. The relative sizes of these gears 37 and 38 are 1 to 2, so that the gear 38 is rotated one-half of a revolution at each operation of the machine, and in order to give it a complete rotation it is necessary to operate the machine twice to complete the cycle of operations as previously explained. Rigidly secured to the side of the gear wheel 38 is a box cam 39 having a cam groove 40 in which rides an anti-friction roller 41 secured to the side of the sliding plate 31. The configuration of the cam groove 40 is such that at the beginning of the first operation of the machine in the complete cycle of operations, the frame 28 carrying the counters is rocked to bring the cost price counter 26 into operative position, in which position it will be held until the beginning of the second operation of the cycle of operations, when the selling price counter will again be brought to operative position. When the machine is at its normal position the cost counter 26 is in such position that the operator may read through an opening in the cabinet the total of said counter. To provide for the reading of the total of the selling price counter 27 there is secured to the end of the shaft 29 a hand knob 42 which may be turned forward to bring the selling price counter to a position to allow the reading of its total. At 43 the cam 39 is cut away to accommodate the anti-friction roller 41 during this hand operated movement and it also serves as a lock for the machine while the selling price counter is at the reading line.

The actuating means for the counters 26 and 27 comprise segment racks 44 journaled on a shaft 45 and connected through nested sleeves 46 (see Fig. 1) to the intermediate gear wheels 23 which as before explained are differentially operated by the segments 20.

The shaft 29 upon which the segmental counter frame 28 is mounted is carried by a sliding carriage 47, which at each operation of the machine is reciprocated by means of a box cam 48 mounted upon the shaft 45 and acting upon an anti-friction roller 49 secured to the sliding carriage 47. This movement for operating the counters is set forth in detail in the aforesaid Letters Patent, No. 703,637 and is not described in detail here, since it constitutes no part of the present invention, but it will be apparent from this construction that during the first operation of the cycle of operations the cost counter will be brought to operative position and operated to an extent depending upon the keys depressed and that during the second operation of the cycle of operations the selling price counter will be brought to operative position and operated upon in a like manner.

Mounted upon the side of the sliding plate 31 is a pin 50 which rides in a curved slot 51 of an arm 52 secured to a shaft 53. This shaft extends through the machine and has upon its other end a toothed segment 54 (see Fig. 3b) meshing with a pinion 55 which is secured to a type carrier 56 forming part of a printing mechanism shown in Fig. 3. It will be understood that this type carrier 56 is provided with type indicating the separate counters and is moved in opposite directions at alternate operations of the machine. The differential segments 20 are each provided (Fig. 1) with rollers 81 riding in grooves in arms 82 rigidly mounted on nested sleeves 83 which are journaled loosely on shaft 53. On the other ends of the sleeves amount type carriers are mounted, one being shown in Fig. 3. The type carrier 56 is mounted beside these amount type carriers and prints on the check with them, so that each amount printed is also identified with the counter on which the said amount was entered. Clearly there is no necessity for a "cost price" type for the checks, as cost amounts are not printed on the checks, but these amounts are intended to be printed on the usual detail strip, which prints from the top of the type carriers as shown in Fig. 3, so that a "cost price" type is provided at the top of carrier 56 as well as a "selling price" type.

A paper strip 57 is fed from a supply roll 58, down two paper chutes 59 and 60, between two feed rollers 61 and 62 and over a knife 63 which knife severs the strip after the printing platen 64 has been operated to take an impression from the type wheels. Referring to Fig. 2 it will be seen that the lower rear edge of the sliding plate 31 is provided with rack teeth which mesh with a gear 65. This gear is secured to a shaft 66 which extends through the machine and is provided with an arm 67 (see Fig. 3a) connected by a link to an arm 68 which is secured to a shaft 69 carrying an eccentric bearing for the lower feed roller 62. From this construction it will be seen that when the sliding plate 31 is in the position shown in Fig. 2 the eccentric bearing of the roller 62 will be in the position shown in Fig. 3a which is the feeding position, but it will be remembered that during the first part of the first operation in the cycle of operations, the sliding plate 31 is moved to bring the cost counter into operative position, therefore the shaft 66 will be rocked to rotate the eccentric bearing of the feed roller 62 to a position like that shown in Fig. 3, thereby lowering said roller away from the feed roller 61. Thus it will be plain that no check is issued during said first operation of the machine in the cycle of operations, but during the second operation in the cycle of operations when the sliding plate 31 is again in its normal position it will be plain that the roller 62 having again been raised will feed the strip and a check will be issued.

The indicator flash 71 is pivoted on the indicator shaft 25 and is actuated by a link 72 having an anti-friction roller 73 mounted upon its lower end and adapted to ride in a cam groove of a cam disk 74 which is secured to the shaft 33. Said shaft as before explained is rotated one-half of a revolution at each operation of the machine, therefore it will be seen that at the beginning of the first operation of the cycle of operations said flash will be moved to concealing position and will not be raised to disclose the indicators until the last part of the second operation of the cycle.

A cash drawer 75 is mounted in the lower part of the casing of the machine and is held in its inner position by a latch rod 76 which straddles the shaft 33 and has mounted at its upper end an anti-friction roller 77 adapted to be engaged by a cam 78 to release the drawer at the end of the second operation of the machine in the cycle of operations.

While the form of mechanism here shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is as follows:

1. In a cash register, the combination with a plurality of accounting devices, a common operating means for said devices, a frame carrying all of said devices and means for automatically rocking said frame at each operation of the register to bring each of the accounting devices alternately into operative relation with the common operating means.

2. In a cash register, the combination with a plurality of accounting devices, an operating mechanism, a frame carrying the accounting devices and means for automatically rocking said frame to bring the accounting devices into operative relation with the operating mechanism in cyclic succession according to a predetermined order.

3. In a cash register, the combination with two independent accounting devices, a common amount determining means therefor, a pivoted frame carrying both of said accounting devices, means for rocking said frame to cause the amount determining means to automatically operate first one accounting device and then the other and then repeat the same cycle of operations, a cash drawer, a drawer releasing means, indicators for the amount determining means, a flash for said indicators and means for operating said flash and said drawer releasing means only intermittently upon complete successive operations of the machine.

4. In a cash register, the combination with two independent counters, a movable frame in which said counters are mounted, an amount determining means for operating said counters, and automatic means for positively rocking said frame to cause a continuous succession of operations of first one counter and then the other and then a repetition of the same cycle of operations.

5. In a cash register, the combination with a single set of counter operating elements, a plurality of manipulative devices controlling the degree of movement of said elements, two independent counters, means for positively and alternatively automatically rocking said counters into operative relation with the operating elements, a printing mechanism, means connected with said rocking means for adjusting a type carrier to designate which counter is being used, a feeding mechanism for a paper strip, a knife for severing said strip to form checks, and a printing platen for causing printed impressions to be made on the check.

6. In a cash register, the combination with two independent counters and an operating mechanism therefor, a revoluble frame for said counters normally in such position that only one counter is readable, means for revolving said revoluble frame to bring the second counter into readable position and a locking means for locking the machine from operation when said second counter is in readable position.

7. In a cash register, the combination with an operating mechanism, and printing devices including a paper feed mechanism, of means controlled by said operating mechanism for automatically and alternately rendering said feed mechanism effective and ineffective upon continued successive operations of the machine.

8. In a cash register, the combination with a plurality of registering devices, a common operating mechanism therefor, and means for automatically moving said registering devices into coöperative relation with said operating mechanism in cyclic succession, a check feeding mechanism, and means operated by said moving means for automatically enabling and disabling said check feeding mechanism, in accordance with the position of said registering devices.

9. In a cash register, the combination with two counting devices, a common operating means therefor, and means for automatically moving said counting devices alternately into coöperative relation with the operating means at successive operations of the register, of a check feeding mechanism, and means controlled by said counting device moving means for alternately enabling and disabling said check feeding mechanism at alternate operations of the register.

10. In a cash register, the combination with a plurality of accounting devices, an operating device therefor, and means for automatically moving said accounting devices in cyclic succession into coöperative relation with said operating devices; of a check feeding mechanism and means controlled by said accounting device moving means for enabling and disabling said mechanism.

11. In a cash register, the combination with an operating mechanism, of a check feeding mechanism constructed to be operated by said operating mechanism, and means for automatically enabling and disabling said check feeding mechanism at successive operations of said operating mechanism.

12. In a cash register, the combination with an operating mechanism, two registering devices operated thereby, and means for automatically throwing said registering devices into coöperative relation at successive operations of said mechanism; of a check feeding mechanism and means controlled by said register throwing means for enabling and disabling said feeding mechanism.

13. In a cash register, the combination with a plurality of counters and an operating means therefor, of a movable frame for said counters normally in such position that only one counter is readable, means for moving said frame to bring the second counter into readable position, and means for rendering the operating means ineffective when the second counter is in readable position.

14. In a cash register, the combination with a normally concealed registering mechanism, of a normally effective operating mechanism therefor, a movable supporting frame for said registering mechanism, means for moving said frame to expose said registering mechanism, and means for rendering the operating mechanism ineffective when the frame is moved to expose the registering mechanism.

15. In a cash register, the combination with a movable frame, of a normally concealed registering mechanism mounted thereon, an operating mechanism for the latter, means for moving the frame to expose the registering mechanism, and locking means for locking the operating mechanism when the registering mechanism is exposed.

16. In a cash register, the combination with a movable frame, of a plurality of accounting devices mounted therein, operating means common to said accounting devices, and means for automatically moving said accounting devices in cyclic succession into coöperative relation with said operating means.

17. In a cash register, the combination with a plurality of accounting devices, of a single set of actuators therefor, an operating mechanism, and means controlled by the operating mechanism for automatically bringing the accounting devices and the actuators into coöperative relation upon successive operations of the machine.

18. In a cash register, the combination with a plurality of accounting devices, of an actuating mechanism common thereto, operating means for automatically and successively bringing the accounting devices and the actuating mechanism into coöperative relation, and a check feeding mechanism connected to said operating means and placed thereby in operative condition only when certain of the accounting devices are in coöperative relation with the actuating mechanism.

19. In a cash register, the combination with a check feeding mechanism comprising two rollers and an eccentric disk on which one of said rollers is mounted, of an operating mechanism therefor, and means controlled by the operating mechanism for turning the eccentrically mounted roller upon successive operations of the operating mechanism so as alternately to render the feeding mechanism effective and ineffective.

20. In a cash register, the combination with a movable frame, of a pair of registering devices mounted therein, an operating mechanism common to said registering devices, means controlled by the operating mechanism for rocking the frame to bring the registering devices alternately into coöperative relation with the operating mechanism, a check feeding mechanism comprising a pair of feed rollers, and means actuated by the frame rocking means for alternately rendering the feeding mechanism effective and ineffective upon successive operations of the operating mechanism.

21. In a cash register, the combination with a plurality of registering devices, of a single set of actuators therefor, an operating mechanism for bringing the actuators and the registering devices into coöperative relation, indicators under the control of the actuators and means under the control of the operating mechanism for exposing the indicators when certain only of the registering devices are in coöperative relation with the actuators.

22. In a cash register, the combination with a plurality of registering devices, of a single set of actuators therefor, an operating mechanism for bringing the actuators and the registering devices into coöperative relation, a cash receptacle, and means under the control of the operating mechanism for exposing said receptacle when certain only of the registering devices are in coöperative relation with the actuators.

23. In a cash register, the combination with a plurality of registering devices, of a single set of actuators therefor, an operating mechanism for bringing the actuators and the registering devices into coöperative relation, indicators under the control of the actuators, a concealing means for the indicators, a normally closed cash receptacle, and means under the control of the operating mechanism for exposing both the indicators and the cash receptacle when certain only of the registering devices are in coöperative relation with the actuators.

24. In a cash register, the combination with a plurality of registering devices, of a single set of actuators therefor, an operating mechanism for bringing the actuators and the registering devices into coöperative relation in cyclic succession, a check feeding mechanism, and means under the control of the operating mechanism for disabling the check feeding mechanism when certain only of the registering devices are in coöperative relation with the actuators.

25. In a machine of the class described, the combination with a plurality of totalizers for keeping separate different classes of transactions, of a set of actuators therefor, an operating mechanism, means controlled by the latter for establishing operative relation between the totalizers and actuators upon successive operations of the operating mechanism, a recording mechanism including a normally inoperative check issuing mechanism, and means for rendering the check issuing mechanism operative as an accompaniment to the entering of transactions upon one of the totalizers.

In testimony whereof I affix my signature in the presence of two witnesses.

WILLIAM M. McCARTHY.

Witnesses:
 RAY C. GLASS,
 CARL W. BURST.